(12) United States Patent
Kitahara et al.

(10) Patent No.: US 9,952,413 B2
(45) Date of Patent: Apr. 24, 2018

(54) IMAGING LENS AND IMAGING APPARATUS

(71) Applicant: FUJIFILM Corporation, Tokyo (JP)

(72) Inventors: Yu Kitahara, Saitama (JP); Takeshi Kamiya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/361,808

(22) Filed: Nov. 28, 2016

(65) Prior Publication Data
US 2017/0199355 A1    Jul. 13, 2017

(30) Foreign Application Priority Data
Jan. 12, 2016   (JP) .................................. 2016-003588

(51) Int. Cl.
| | | |
|---|---|---|
| G02B 13/00 | (2006.01) | |
| G02B 9/64 | (2006.01) | |
| G02B 27/00 | (2006.01) | |
| B60R 1/00 | (2006.01) | |

(52) U.S. Cl.
CPC ........... G02B 13/0045 (2013.01); G02B 9/64 (2013.01); G02B 27/0025 (2013.01); B60R 1/00 (2013.01); B60R 2300/10 (2013.01); B60R 2300/8033 (2013.01); G02B 13/00 (2013.01)

(58) Field of Classification Search
CPC ...... G02B 13/00; G02B 13/0045; G02B 9/00; G02B 9/64; G02B 27/0025
USPC ................................................ 359/762, 755
See application file for complete search history.

(56) References Cited

U.S. PATENT DOCUMENTS

| | | | | |
|---|---|---|---|---|
| 5,434,713 | A | 7/1995 | Sato | |
| 2013/0235467 | A1* | 9/2013 | Heu | G02B 13/06 359/684 |
| 2014/0376105 | A1* | 12/2014 | Sekine | G02B 3/04 359/708 |
| 2015/0022908 | A1* | 1/2015 | Tomioka | G02B 9/64 359/751 |
| 2015/0205070 | A1* | 7/2015 | Lee | G02B 13/0045 359/713 |
| 2015/0378138 | A1* | 12/2015 | Lee | G02B 15/177 359/691 |
| 2016/0202452 | A1* | 7/2016 | Kuo | G02B 13/04 359/708 |
| 2016/0320590 | A1* | 11/2016 | Mori | G02B 13/0045 |
| 2016/0377839 | A1* | 12/2016 | Chen | G02B 13/0045 359/708 |

FOREIGN PATENT DOCUMENTS

JP          H05-273459 A         10/1993

* cited by examiner

*Primary Examiner* — William R Alexander
(74) *Attorney, Agent, or Firm* — Studebaker & Brackett PC

(57) ABSTRACT

Provided are an imaging lens, which is a wide-angle imaging lens and is capable of satisfactorily correcting various aberrations, and an imaging apparatus which includes this imaging lens. The imaging lens consists of, in order from an object side: a first lens L1 that has a negative refractive power; a second lens L2 that has a negative refractive power; a third lens L3 that has a positive refractive power; a fourth lens L4 that has a negative refractive power; a fifth lens L5 that has a positive refractive power; a sixth lens L6 that has a positive refractive power; and a seventh lens L7 that has a negative refractive power. The following conditional expression (1) is satisfied.

$$-2 < f/f12 < -1.47 \qquad (1)$$

12 Claims, 13 Drawing Sheets

EXAMPLE 6

US 9,952,413 B2

IMAGING LENS AND IMAGING APPARATUS

CROSS-REFERENCE TO RELATED APPLICATIONS

The present application claims priority under 35 U.S.C. § 119 to Japanese Patent Application No. 2016-003588, filed on Jan. 12, 2016. Each of the above application(s) is hereby expressly incorporated by reference, in its entirety, into the present application.

BACKGROUND OF THE INVENTION

1. Field of the Invention

The present invention relates to an imaging lens that is appropriate for an on-board camera and an imaging apparatus that has the imaging lens.

2. Description of the Related Art

Recently, cameras are mounted on a vehicle, and are used to assist a driver to check blind areas such as sides lateral to the driver and/or a rear side or are used to recognize images such as vehicles around own vehicle, pedestrians, and/or obstacles. As an imaging lens usable in such an on-board camera, for example, an imaging lens described in JP1993-273459A (JP-H05-273459A) to be described later is known. JP1993-273459A (JP-H05-273459A) discloses a lens system having seven elements.

SUMMARY OF THE INVENTION

Generally, it is necessary for an on-board camera to capture an image in a range equal to or greater than field of view of human vision, and thus a certain degree of wide-angle performance is necessary therefor.

Further, in an on-board camera, high optical performance is necessary for improvement in visibility of an imaging region and/or improvement in accuracy of recognition of obstacles. However, correction of various aberrations is not sufficient for the lens system disclosed in JP1993-273459A (JP-H05-273459A). Thus, there has been a demand for an imaging lens in which various aberrations are satisfactorily corrected.

The present invention has been made in consideration of the above-mentioned situation, and its object is to provide an imaging lens, which is a wide-angle imaging lens and is capable of satisfactorily correcting various aberrations, and an imaging apparatus which comprises this imaging lens.

The imaging lens of the present invention consists of, in order from an object side: a first lens that has a negative refractive power; a second lens that has a negative refractive power; a third lens that has a positive refractive power; a fourth lens that has a negative refractive power; a fifth lens that has a positive refractive power; a sixth lens that has a positive refractive power; and a seventh lens that has a negative refractive power. The imaging lens satisfies the following conditional expression (1).

$$-2 < f/f12 < -1.47 \qquad (1)$$

Here, f is a focal length of a whole system, and
f12 is a composite focal length of the first lens and the second lens.

It is preferable that the imaging lens of the present invention satisfies the following conditional expression (1-1).

$$-1.75 < f/f12 < -1.55 \qquad (1\text{-}1)$$

It is preferable that an object side surface of the first lens is a convex surface.

It is preferable that the imaging lens satisfies the following conditional expression (2), and it is more preferable that the imaging lens satisfies the following conditional expression (2-1).

$$-0.2 < f/f1 < 0 \qquad (2)$$

$$-0.15 < f/f1 < -0.08 \qquad (2\text{-}1)$$

Here, f is a focal length of a whole system, and
f1 is a focal length of the first lens.

An imaging apparatus of the present invention comprises the above-mentioned imaging lens of the present invention.

It should be noted that a term "includes, substantially ~" means that the imaging lens may include not only the above-mentioned elements but also lenses substantially having no powers, optical elements, which are not lenses, such as a diaphragm, a mask, a cover glass, and a filter, and mechanism parts such as a lens flange, a lens barrel, an imaging element, and/or a hand shaking correction mechanism.

Further, reference signs of surface shapes, radii of curvature, and/or refractive powers of the lenses are assumed as those in paraxial regions in a case where some lenses have aspheric surfaces.

The imaging lens of the present invention consists of, in order from the object side: the first lens that has a negative refractive power; the second lens that has a negative refractive power; the third lens that has a positive refractive power; the fourth lens that has a negative refractive power; the fifth lens that has a positive refractive power; the sixth lens that has a positive refractive power; and the seventh lens that has a negative refractive power. The imaging lens satisfies the following conditional expression (1). Therefore, it is possible to form an imaging lens that is a wide-angle imaging lens and is capable of satisfactorily correcting various aberrations.

$$-2 < f/f12 < -1.47 \qquad (1)$$

Further, the imaging apparatus of the present invention comprises the imaging lens of the present invention. Thus, it is possible to appropriately capture a high quality image with a wide angle of view.

DESCRIPTION OF THE PREFERRED EMBODIMENTS

Figure 1:
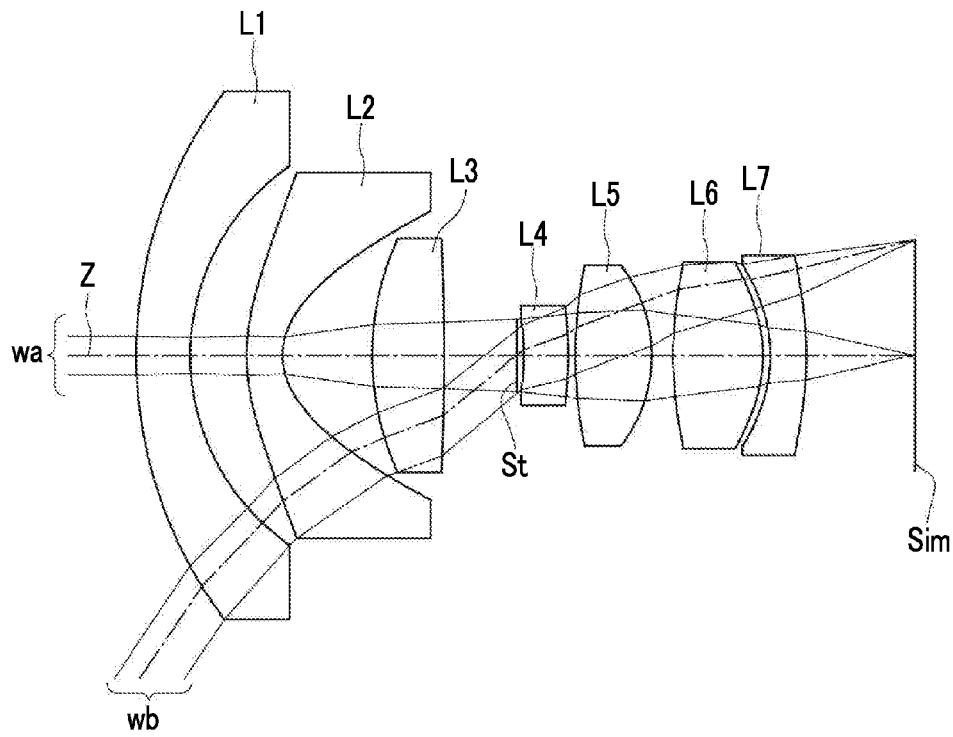
FIG. 1 is a cross-sectional view illustrating a lens configuration of an imaging lens (common to Example 1) according to an embodiment of the present invention.

Hereinafter, embodiments of the present invention will be described with reference to drawings. FIG. 1 is a cross-sectional view illustrating a lens configuration of an imaging lens according to an embodiment of the present invention. The exemplary configuration shown in FIG. 1 is the same as the configuration of the imaging lens of Example 1 to be described later. In FIG. 1, a left side thereof is an object side, and a right side thereof is an image side. In addition, an aperture diaphragm St shown in the drawing does not necessarily indicate its sizes and/or shapes, but indicates a position of the diaphragm on the optical axis Z. Further, on-axis rays wa and rays with a maximum angle of view wb are also shown together.

As shown in FIG. 1, the imaging lens includes, substantially in order from an object side: a first lens L1 that has a negative refractive power; a second lens L2 that has a negative refractive power; a third lens L3 that has a positive refractive power; a fourth lens L4 that has a negative refractive power; a fifth lens L5 that has a positive refractive power; a sixth lens L6 that has a positive refractive power; and a seventh lens L7 that has a negative refractive power. As described above, both of the first lens L1 and the second lens L2, which are two lenses disposed in order from the most object side, are formed as negative lenses, and thereby it becomes easy to increase an angle of view of the whole lens system.

The third lens L3, which is disposed after the first lens L1 and the second lens L2, is formed as a positive lens. Thereby, it is possible to cancel various aberrations, which occurs in the first lens L1 and the second lens L2, particularly lateral chromatic aberration. As a result, this configuration is advantageous in an increase in angle of view.

The fourth lens L4 subsequent to the third lens L3 is formed as a negative lens. Thereby, it is possible to correct longitudinal chromatic aberration and spherical aberration.

The seventh lens L7 closest to the image side is formed as a negative lens. Thereby, it is possible to correct longitudinal chromatic aberration, lateral chromatic aberration, and spherical aberration.

The imaging lens is configured to satisfy the following conditional expression (1). By not allowing the result of the conditional expression (1) to be equal to or greater than the upper limit, it is possible to prevent a negative composite refractive power of the first lens L1 and the second lens L2 from extremely decreasing. Thus, this contributes to wide-angle. By not allowing the result of the conditional expression (1) to be equal to or less than the lower limit, it is possible to prevent the negative composite refractive power of the first lens L1 and the second lens L2 from extremely increasing. As a result, it is possible to prevent an absolute value of radius of curvature of each surface of the lenses from extremely decreasing. Thus, it becomes easy to prevent rays from drastically being deflected, and it becomes easy to correct distortion. In addition, if the following conditional expression (1-1) is satisfied, it is possible to obtain more favorable characteristics.

$$-2 < f/f12 < -1.47 \qquad (1)$$

$$-1.75 < f/f12 < -1.55 \qquad (1\text{-}1)$$

Here, f is a focal length of a whole system, and
f12 is a composite focal length of the first lens and the second lens In the imaging lens of the present embodiment, it is preferable that an object side surface of the first lens is a convex surface. With such a configuration, it is possible to prevent astigmatism, lateral chromatic aberration, and excessive distortion from occurring.

It is preferable that the imaging lens satisfies the following conditional expression (2). By not allowing the result of the conditional expression (2) to be equal to or greater than the upper limit, it becomes easy to increase an angle of view thereof. By not allowing the result of the conditional expression (2) to be equal to or less than the lower limit, it becomes easy to prevent rays from drastically being deflected through the first lens L1. Thus, it becomes easy to correct distortion. In addition, if the following conditional expression (2-1) is satisfied, it is possible to obtain more favorable characteristics.

$$-0.2 < f/f1 < 0 \qquad (2)$$

$$-0.15 < f/f1 < -0.08 \qquad (2\text{-}1)$$

Here, f is a focal length of a whole system, and
f1 is a focal length of the first lens.

In a case of using the imaging lens under severe environment, it is preferable to perform protective multilayer film coating. Not only the protective coating but also anti-reflective coating for reducing ghost light in use may be performed.

If the imaging lens is intended to be applied to imaging apparatus, a cover glass, a prism, and/or various filters such as an infrared cut filter and a lowpass filter may be disposed between the lens system and an image plane Sim in accordance with a configuration of a camera on which the lens is mounted. In addition, instead of positioning such various filters between the lens system and the image plane Sim, such various filters may be disposed between lenses, and coating for applying the same effects as the various filters may be performed on a lens surface of any one lens thereof.

Next, numerical examples of the imaging lens of the present invention will be described.

First, the imaging lens of Example 1 will be described. FIG. 1 is a cross-sectional view illustrating a lens configuration of the imaging lens of Example 1. In FIG. 1 and FIGS. 2 to 6 corresponding to Examples 2 to 6 to be described later, left sides thereof are the object side, and right sides thereof are the image side. In addition, the aperture diaphragm St shown in the drawings does not necessarily indicate its sizes and/or shapes, and indicates a position of the diaphragm on the optical axis Z.

Table 1 shows basic lens data of the imaging lens of Example 1, Table 2 shows data about specification, and Table 3 shows data about aspheric coefficients. Hereinafter, meanings of the reference signs in the tables are, for example, as described in Example 1, and are basically the same as those in Examples 2 to 6.

In the lens data of Table 1, the column of the surface number shows surface numbers. The surface of the elements closest to the object side is the first surface, and the surface numbers sequentially increase toward the image side. The column of the radius of curvature shows radii of curvature of the respective surfaces. The column of the surface distance shows distances on the optical axis Z between the respective surfaces and the subsequent surfaces. The column of n shows refractive indexes of the respective optical elements at the d-line (a wavelength of 587.6 nm, where nm represents nanometer). The column of ν shows Abbe numbers of the respective optical elements at the d-line (a wavelength of 587.6 nm).

Here, the sign of the radius of curvature is positive in a case where a surface has a shape convex toward the object side, and is negative in a case where a surface has a shape convex toward the image side. The basic lens data also includes and indicates the aperture diaphragm St. In a place of a surface number of a surface corresponding to the aperture diaphragm St, the surface number and a term of (diaphragm) are noted.

The data about specification of Table 2 shows values of a focal length f' of the whole system, a back focal length Bf', an F number FNo., and a total angle of view 2ω.

In the basic lens data and the data about specification, degree ([°]) is used as a unit of an angle, and millimeter (mm) is used as a unit of a length, but appropriate different units may be used since the optical system can be used even in a case where the system is enlarged or reduced in proportion.

In the lens data of Table 1, the reference sign * is attached to surface numbers of aspheric surfaces, and radii of curvature of the aspheric surfaces are represented by numerical values of paraxial radii of curvature. The data about aspheric coefficients of Table 3 shows the surface numbers of the aspheric surfaces and aspheric coefficients of the aspheric surfaces. The aspheric coefficients are values of the coefficients KA and Am (m=3, . . . , 12) in aspheric surface expression represented as the following expression.

$$Zd = C \cdot h^2 / \{1 + (1 - KA \cdot C^2 \cdot h^2)^{1/2}\} \pm \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric coefficients (m=3, . . . , 12).

TABLE 1

Example 1 Lens Data (n and ν are at d-line)

| Surface number | Radius of curvature | Surface distance | n | ν |
|---|---|---|---|---|
| 1 | 12.1172 | 1.5000 | 1.62299 | 58.16 |
| 2 | 6.3609 | 1.5657 | | |
| *3 | 5.1945 | 1.0000 | 1.61921 | 63.85 |
| *4 | 1.7988 | 2.5000 | | |
| 5 | 7.7408 | 2.0000 | 1.75520 | 27.53 |
| 6 | −77.3187 | 2.0000 | | |
| 7 (Diaphragm) | ∞ | 0.2000 | | |
| *8 | −6.6220 | 1.2330 | 2.00178 | 19.32 |
| *9 | −11.4178 | 0.2000 | | |
| 10 | 12.1554 | 2.1247 | 1.59522 | 67.73 |
| 11 | −4.0777 | 0.5968 | | |
| *12 | 10.8866 | 2.5000 | 1.61881 | 63.85 |
| *13 | −3.8432 | 0.2043 | | |
| *14 | −4.0022 | 1.0218 | 1.92286 | 20.88 |
| *15 | −10.0786 | 3.0222 | | |

TABLE 2

Example 1 Specification

| | |
|---|---|
| f' | 2.44 |
| Bf' | 3.03 |
| FNo. | 2.30 |
| 2ω [°] | 111.6 |

TABLE 3

Example 1 Aspheric Coefficients

| | Surface number | | |
|---|---|---|---|
| | 3 | 4 | 8 |
| KA | −3.7124836E+00 | −2.7421136E−02 | 9.9999932E+00 |
| A3 | −6.9797215E−04 | −1.2901199E−03 | 1.3983993E−04 |
| A4 | −2.4087837E−04 | −3.2590284E−05 | −3.0656526E−05 |
| A5 | −1.6239874E−05 | −1.0236271E−05 | −8.6517785E−05 |
| A6 | 4.6097718E−06 | −8.5665289E−06 | 1.9623428E−04 |
| A7 | 1.0927984E−06 | −1.8586390E−06 | 6.8792185E−05 |
| A8 | −4.5383429E−09 | −1.0279228E−07 | −4.3283078E−05 |
| A9 | −2.5471728E−08 | −2.4824479E−08 | 3.3125837E−05 |
| A10 | 1.1012681E−09 | −3.7808581E−09 | 1.1038598E−04 |
| A11 | 0.0000000E+00 | 0.0000000E+00 | 0.0000000E+00 |
| A12 | 0.0000000E+00 | 0.0000000E+00 | 0.0000000E+00 |

| | Surface number | | |
|---|---|---|---|
| | 9 | 12 | 13 |
| KA | 3.6827054E+00 | −6.9723772E+00 | −7.3467830E−01 |
| A3 | 2.7383483E−05 | −7.6351514E−05 | 9.9429600E−05 |
| A4 | 2.0317561E−04 | −8.5450142E−05 | 5.2344454E−04 |
| A5 | 1.3739705E−04 | 1.5255919E−05 | 1.3429253E−04 |
| A6 | 7.2046052E−05 | 1.0415505E−05 | −1.5205173E−05 |
| A7 | 1.9987841E−05 | 2.8139330E−06 | −7.9511004E−06 |
| A8 | 2.9432303E−05 | 7.7898782E−07 | −1.1787152E−07 |
| A9 | 1.0864921E−05 | 1.7539824E−07 | 1.8046883E−07 |
| A10 | 4.4723238E−06 | 7.1702753E−08 | 1.0812656E−08 |
| A11 | 0.0000000E+00 | 0.0000000E+00 | 0.0000000E+00 |
| A12 | 0.0000000E+00 | 0.0000000E+00 | 0.0000000E+00 |

| | Surface number | |
|---|---|---|
| | 14 | 15 |
| KA | 3.2446635E−01 | 6.2989161E+00 |
| A3 | 1.6326200E−03 | 2.0581332E−03 |
| A4 | 1.5506045E−04 | 6.6793276E−04 |
| A5 | 5.9771037E−05 | 8.9908190E−05 |
| A6 | 1.3974466E−05 | −6.7605400E−06 |
| A7 | 3.9283222E−06 | −7.9899035E−06 |
| A8 | −5.3846826E−07 | 4.4767828E−06 |
| A9 | −1.5374489E−07 | 1.0349923E−06 |
| A10 | −8.7888705E−08 | 7.4565929E−08 |
| A11 | 0.0000000E+00 | 0.0000000E+00 |
| A12 | 0.0000000E+00 | 0.0000000E+00 |

Figure 7:
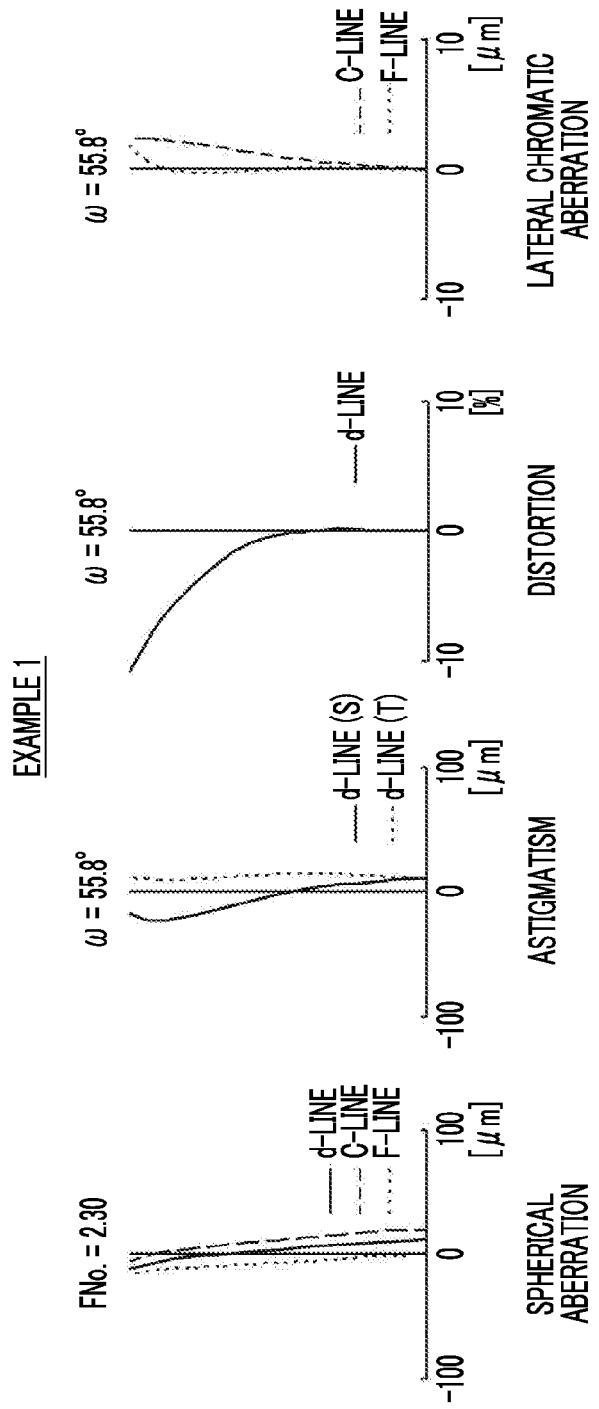
FIG. 7 is a diagram of aberrations of the imaging lens of Example 1 of the present invention.

FIG. 7 shows aberration diagrams of the imaging lens of Example 1. In addition, in order from the left side of FIG. 7, spherical aberration, astigmatism, distortion, and lateral chromatic aberration are shown. Such aberration diagrams show aberrations in a state where the object distance is set as an infinite distance. The aberration diagrams illustrating spherical aberration, astigmatism, and distortion indicates aberrations that occur when the d-line (a wavelength of 587.6 nm) is set as a reference wavelength. In the spherical aberration diagram, aberrations at the d-line (a wavelength of 587.6 nm), the C-line (a wavelength of 656.3 nm), and the F-line (a wavelength of 486.1 nm) are respectively indicated by the solid line, the long dashed line, and the short dashed line. In the astigmatism diagram, aberrations in sagittal and tangential directions are respectively indicated by the solid line and the short dashed line. In the lateral chromatic aberration diagram, aberrations at the C-line (a wavelength of 656.3 nm) and the F-line (a wavelength of 486.1 nm) are respectively indicated by the long dashed line and the short dashed line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Figure 2:
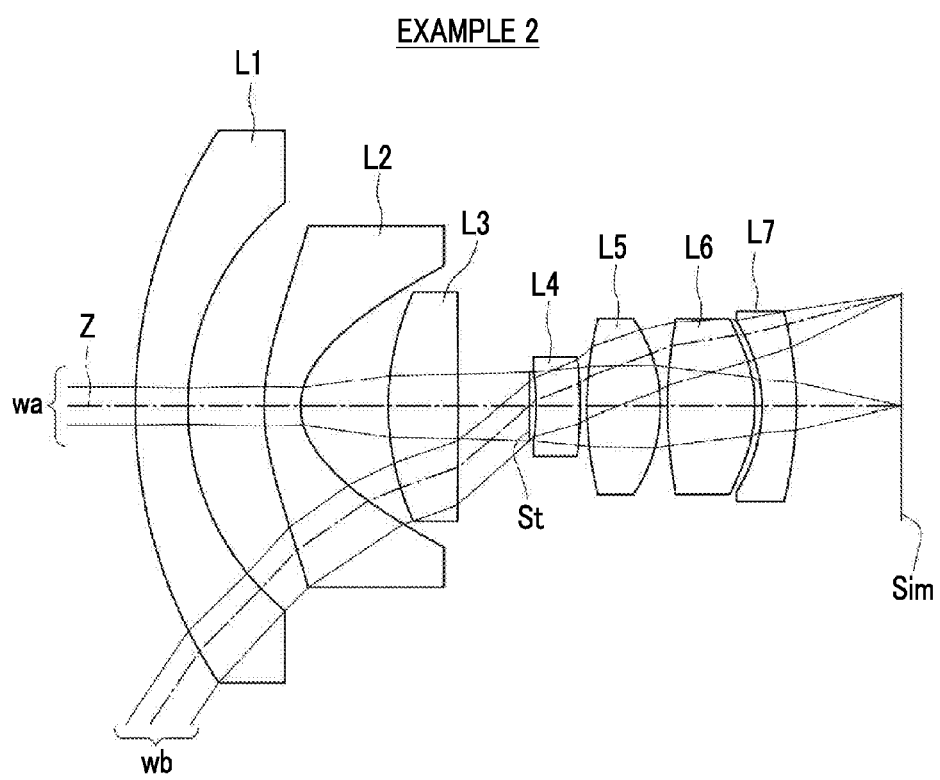
FIG. 2 is a cross-sectional view illustrating a lens configuration of an imaging lens of Example 2 of the present invention.
Figure 8:
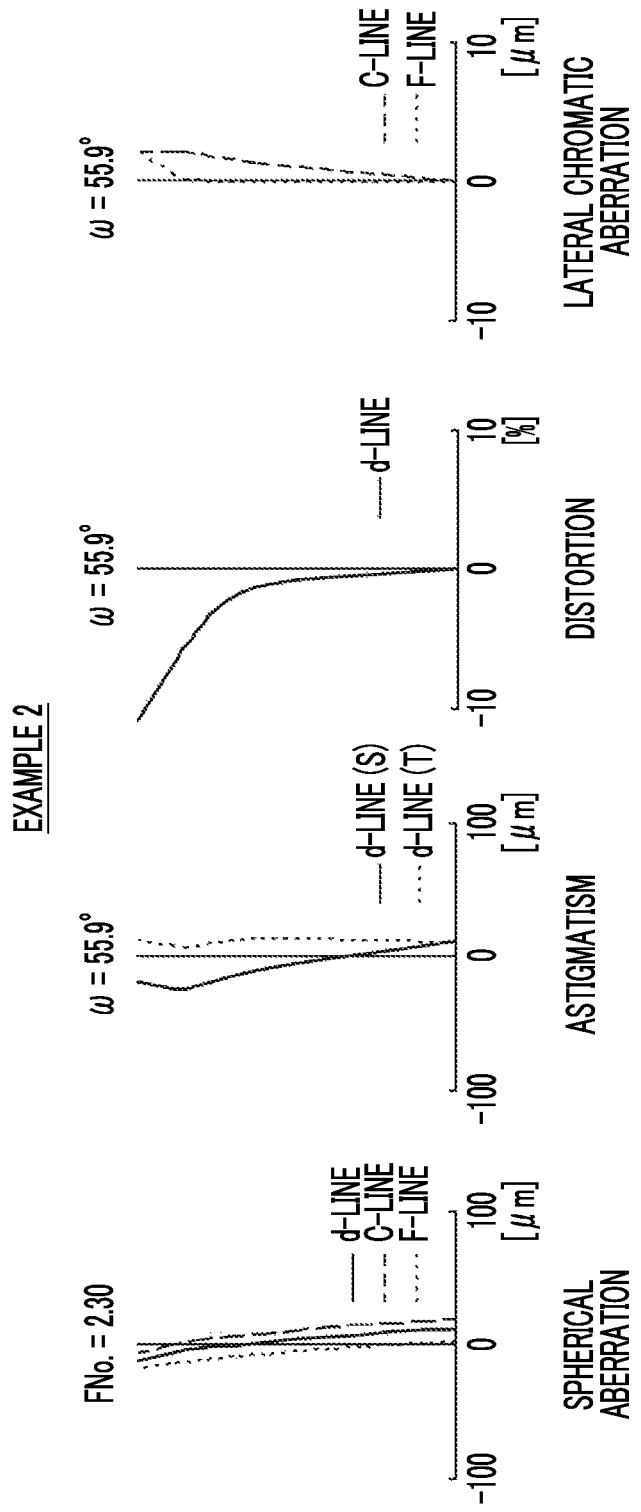
FIG. 8 is a diagram of aberrations of the imaging lens of Example 2 of the present invention.

Next, an imaging lens of Example 2 will be described. FIG. 2 is a cross-sectional view illustrating a lens configuration of the imaging lens of Example 2. Further, Table 4 shows basic lens data of the imaging lens of Example 2, Table 5 shows data about specification, and Table 6 shows data about aspheric coefficients. FIG. 8 shows aberration diagrams thereof.

TABLE 4

Example 2 Lens Data (n and ν are at d-line)

| Surface number | Radius of curvature | Surface distance | n | ν |
|---|---|---|---|---|
| 1 | 14.1022 | 1.5000 | 1.61997 | 63.88 |
| 2 | 7.4563 | 2.1735 | | |
| *3 | 5.5404 | 1.0463 | 1.61921 | 63.85 |
| *4 | 1.7907 | 2.5000 | | |
| 5 | 7.7347 | 2.0000 | 1.91650 | 31.60 |
| 6 | −189.9696 | 2.0000 | | |
| 7 (Diaphragm) | ∞ | 0.2000 | | |
| *8 | −6.5868 | 1.2519 | 1.92286 | 20.88 |
| *9 | −12.3956 | 0.2000 | | |
| 10 | 10.1612 | 2.0954 | 1.61997 | 63.88 |
| 11 | −4.4145 | 0.2000 | | |
| *12 | 11.8191 | 2.5000 | 1.61881 | 63.85 |
| *13 | −3.7573 | 0.2000 | | |
| *14 | −4.0515 | 1.0024 | 2.00178 | 19.32 |
| *15 | −9.1811 | 3.0005 | | |

TABLE 5

Example 2 Specification

| | |
|---|---|
| f | 2.43 |
| Bf | 3.01 |
| FNo. | 2.30 |
| 2ω[°] | 111.8 |

TABLE 6

Example 2 Aspheric Coefficients

| Surface number | 3 | 4 | 8 |
|---|---|---|---|
| KA | −4.6145543E+00 | −3.7175925E−02 | 1.0000001E+01 |
| A3 | −7.4634167E−04 | −1.3125381E−03 | 1.5608788E−04 |

TABLE 6-continued

Example 2 Aspheric Coefficients

| | | | |
|---|---|---|---|
| A4 | −2.4869841E−04 | −2.8345217E−05 | −3.5650904E−05 |
| A5 | −1.7706157E−05 | −1.0895763E−05 | −8.7132670E−05 |
| A6 | 4.2582511E−06 | −8.4760057E−06 | 1.9605122E−04 |
| A7 | 1.0665174E−06 | −1.9236327E−06 | 6.8776306E−05 |
| A8 | −9.4050709E−09 | −8.8849883E−08 | −4.3107223E−05 |
| A9 | −2.4720832E−08 | −2.5796010E−08 | 3.3119614E−05 |
| A10 | 1.1276763E−09 | −3.8820092E−09 | 1.1038578E−04 |
| A11 | 0.0000000E+00 | 0.0000000E+00 | 0.0000000E+00 |
| A12 | 0.0000000E+00 | 0.0000000E+00 | 0.0000000E+00 |

| Surface number | 9 | 12 | 13 |
|---|---|---|---|
| KA | 7.7501760E+00 | −9.9899059E+00 | −8.9147878E−01 |
| A3 | 3.3712198E−05 | −6.8336793E−05 | 1.0286327E−04 |
| A4 | 2.0487424E−04 | −8.8698181E−05 | 5.2001098E−04 |
| A5 | 1.3698982E−04 | 1.4974775E−05 | 1.3298815E−04 |
| A6 | 7.1793553E−05 | 1.0128634E−05 | −1.5212331E−05 |
| A7 | 1.9956746E−05 | 2.7992643E−06 | −7.9922531E−06 |
| A8 | 2.9429085E−05 | 7.5929525E−07 | −1.2429596E−07 |
| A9 | 1.0864481E−05 | 1.7353081E−07 | 1.7958759E−07 |
| A10 | 4.5356657E−06 | 7.1880955E−08 | 1.0715447E−08 |
| A11 | 0.0000000E+00 | 0.0000000E+00 | 0.0000000E+00 |
| A12 | 0.0000000E+00 | 0.0000000E+00 | 0.0000000E+00 |

| Surface number | 14 | 15 |
|---|---|---|
| KA | 5.0245377E−01 | 5.0260469E+00 |
| A3 | 1.6129016E−03 | 2.0290316E−03 |
| A4 | 1.5710523E−04 | 6.6763621E−04 |
| A5 | 5.9409212E−05 | 8.9227159E−05 |
| A6 | 1.3701715E−05 | −6.2309009E−06 |
| A7 | 3.9505773E−06 | −7.9813698E−06 |
| A8 | −5.3906044E−07 | 4.4721290E−06 |
| A9 | −1.5425452E−07 | 1.0356941E−06 |
| A10 | −8.8536471E−08 | 7.4431124E−08 |
| A11 | 0.0000000E+00 | 0.0000000E+00 |
| A12 | 0.0000000E+00 | 0.0000000E+00 |

Figure 3:
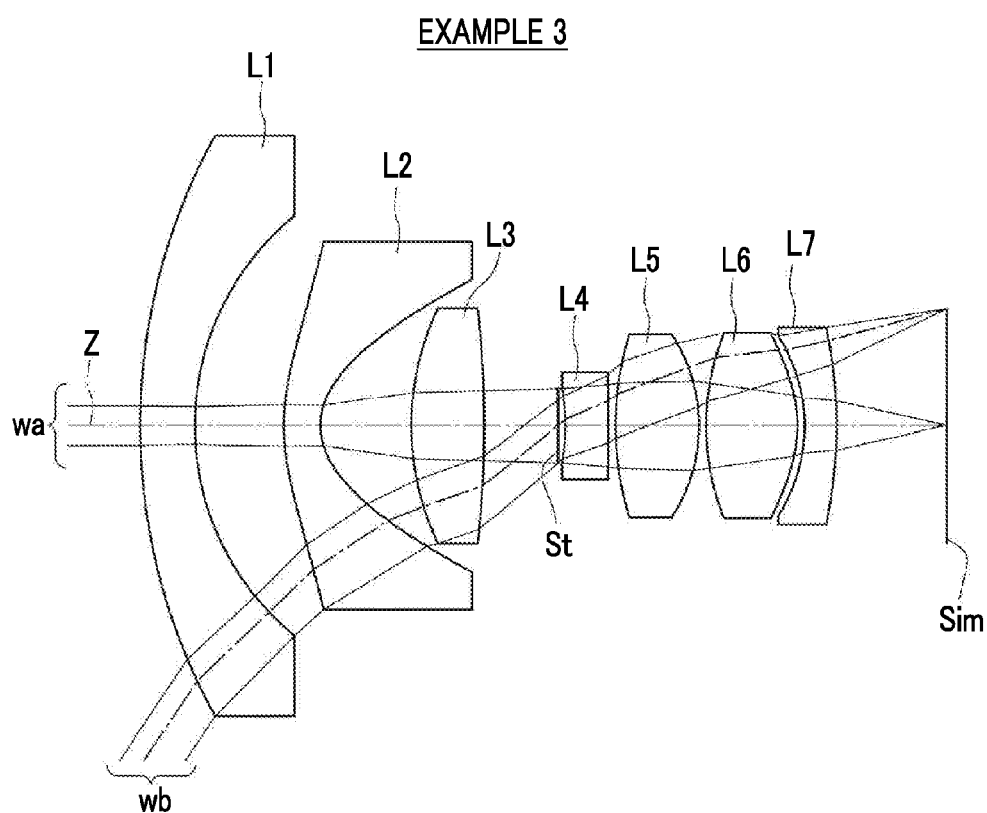
FIG. 3 is a cross-sectional view illustrating a lens configuration of an imaging lens of Example 3 of the present invention.
Figure 9:
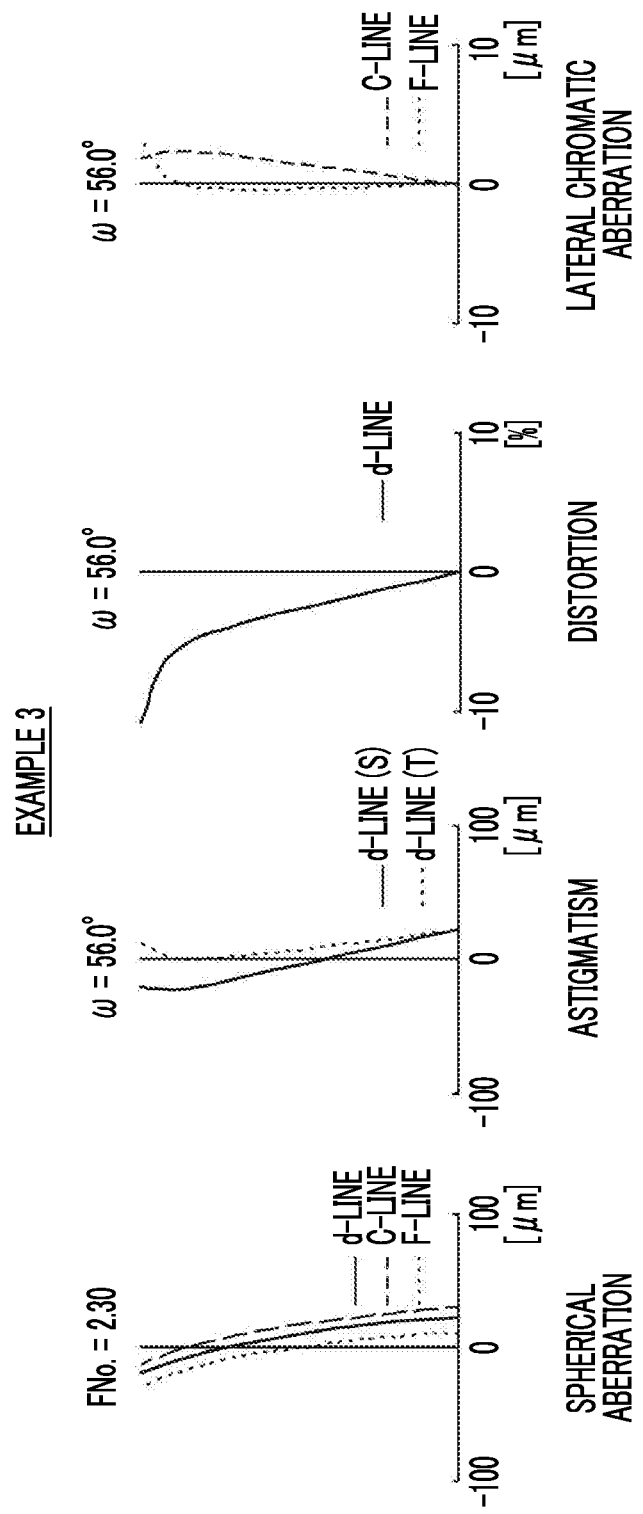
FIG. 9 is a diagram of aberrations of the imaging lens of Example 3 of the present invention.

Next, an imaging lens of Example 3 will be described. FIG. 3 is a cross-sectional view illustrating a lens configuration of the imaging lens of Example 3. Further, Table 7 shows basic lens data of the imaging lens of Example 3, Table 8 shows data about specification, and Table 9 shows data about aspheric coefficients. FIG. 9 shows aberration diagrams thereof.

TABLE 7

Example 3 Lens Data (n and ν are at d-line)

| Surface number | Radius of curvature | Surface distance | n | ν |
|---|---|---|---|---|
| 1 | 16.2703 | 1.5000 | 1.62041 | 60.29 |
| 2 | 7.3647 | 2.4435 | | |
| *3 | 5.6889 | 1.0000 | 1.53112 | 55.30 |
| *4 | 1.7208 | 2.5000 | | |
| 5 | 7.4379 | 2.0000 | 1.72825 | 28.46 |
| 6 | −28.8448 | 2.0000 | | |
| 7 (Diaphragm) | ∞ | 0.2000 | | |
| *8 | −6.5627 | 1.1815 | 1.63360 | 23.61 |
| *9 | −62.8548 | 0.2000 | | |
| 10 | 8.3671 | 2.2890 | 1.60300 | 65.44 |
| 11 | −4.5370 | 0.2000 | | |
| *12 | 6.7813 | 2.5000 | 1.53112 | 55.30 |
| *13 | −3.6273 | 0.2000 | | |
| *14 | −4.2697 | 0.9024 | 2.00178 | 19.32 |
| *15 | −11.0611 | 3.0177 | | |

TABLE 8

Example 3 Specification

| | |
|---|---|
| f' | 2.43 |
| Bf' | 3.04 |
| FNo. | 2.30 |
| 2ω[°] | 112.0 |

TABLE 9

Example 3 Aspheric Coefficients

| Surface number | 3 | 4 | 8 |
|---|---|---|---|
| KA | −5.5993745E+00 | −5.3976116E−02 | 1.0000008E+01 |
| A3 | −8.5911860E−04 | −1.2433301E−03 | 1.8478184E−04 |
| A4 | −2.8833981E−04 | −4.8292675E−05 | −2.5829554E−05 |
| A5 | −2.5684600E−05 | −9.6864425E−06 | −9.7027597E−05 |
| A6 | 4.1298641E−06 | −8.8699613E−06 | 1.8072370E−04 |
| A7 | 1.1928632E−06 | −1.9275162E−06 | 6.8700504E−05 |
| A8 | 2.2249672E−08 | −8.4730013E−08 | −4.3744218E−05 |
| A9 | −2.2210448E−08 | −2.6071043E−08 | 3.4279065E−05 |
| A10 | 4.6176137E−12 | −3.2904120E−09 | 1.0767822E−04 |
| A11 | 0.0000000E+00 | 0.0000000E+00 | 0.0000000E+00 |
| A12 | 0.0000000E+00 | 0.0000000E+00 | 0.0000000E+00 |

| Surface number | 9 | 12 | 13 |
|---|---|---|---|
| KA | 3.1637325E+00 | 3.8393145E−01 | −1.6370641E+00 |
| A3 | 7.3546893E−05 | −1.4332845E−04 | −2.5578649E−05 |
| A4 | 1.9980084E−04 | −7.5084191E−05 | 4.9990559E−04 |
| A5 | 1.3866345E−04 | 2.2677690E−05 | 1.3268573E−04 |
| A6 | 7.1782422E−05 | 1.1011916E−05 | −1.5343916E−05 |
| A7 | 1.9875168E−05 | 2.6876748E−06 | −8.0642315E−06 |
| A8 | 2.9435508E−05 | 7.5835579E−07 | −1.3199174E−07 |
| A9 | 1.0267295E−05 | 1.6630653E−07 | 1.7648513E−07 |
| A10 | 4.5349252E−06 | 7.0067987E−08 | 1.0880466E−08 |
| A11 | 0.0000000E+00 | 0.0000000E+00 | 0.0000000E+00 |
| A12 | 0.0000000E+00 | 0.0000000E+00 | 0.0000000E+00 |

| Surface number | 14 | 15 |
|---|---|---|
| KA | 8.4402363E−01 | 8.3120529E+00 |
| A3 | 1.8182198E−03 | 1.8688281E−03 |
| A4 | 1.6043954E−04 | 6.8037532E−04 |
| A5 | 5.8802268E−05 | 8.8405854E−05 |
| A6 | 1.3904846E−05 | −7.1847040E−06 |
| A7 | 3.9183129E−06 | −8.1256152E−06 |
| A8 | −5.3007905E−07 | 4.4955417E−06 |
| A9 | −1.6489729E−07 | 1.0110713E−06 |
| A10 | −8.7907438E−08 | 7.3809813E−08 |
| A11 | 0.0000000E+00 | 0.0000000E+00 |
| A12 | 0.0000000E+00 | 0.0000000E+00 |

Figure 4:
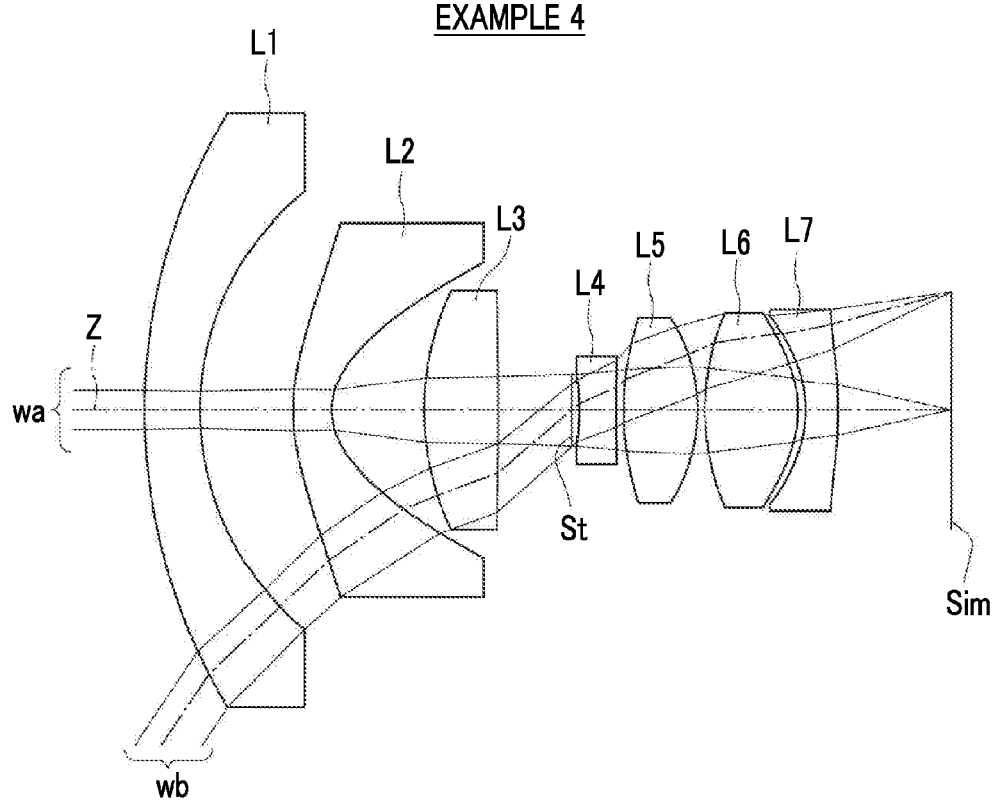
FIG. 4 is a cross-sectional view illustrating a lens configuration of an imaging lens of Example 4 of the present invention.
Figure 10:
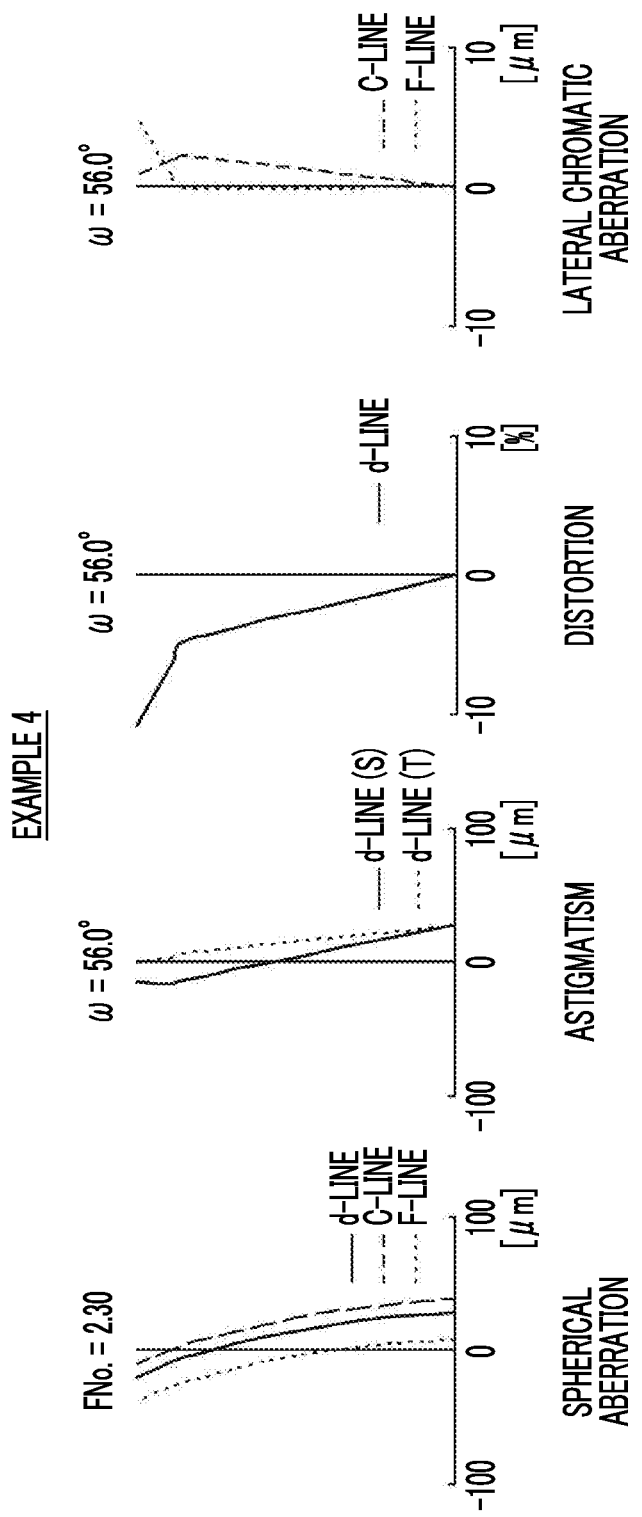
FIG. 10 is a diagram of aberrations of the imaging lens of Example 4 of the present invention.

Next, an imaging lens of Example 4 will be described. FIG. 4 is a cross-sectional view illustrating a lens configuration of the imaging lens of Example 4. Further, Table 10 shows basic lens data of the imaging lens of Example 4, Table 11 shows data about specification thereof, and Table 12 shows data about aspheric coefficients thereof. FIG. 10 shows aberration diagrams thereof.

TABLE 10

Example 4 Lens Data (n and ν are at d-line)

| Surface number | Radius of curvature | Surface distance | n | ν |
|---|---|---|---|---|
| 1 | 15.3083 | 1.5000 | 1.72916 | 54.67 |
| 2 | 7.5879 | 2.5000 | | |
| *3 | 5.4101 | 1.0429 | 1.53112 | 55.30 |
| *4 | 1.7596 | 2.5000 | | |
| 5 | 7.5182 | 2.0000 | 1.84666 | 23.78 |
| 6 | −240.5982 | 2.0000 | | |
| 7 (Diaphragm) | ∞ | 0.2000 | | |
| *8 | −6.3769 | 1.0000 | 1.63360 | 23.61 |
| *9 | 76.2318 | 0.2000 | | |
| 10 | 8.0030 | 2.0000 | 1.59522 | 67.73 |
| 11 | −4.6752 | 0.2000 | | |
| *12 | 6.6741 | 2.5000 | 1.53112 | 55.30 |
| *13 | −3.1301 | 0.2000 | | |
| *14 | −3.3771 | 0.9000 | 1.63360 | 23.61 |
| *15 | −10.7684 | 3.0704 | | |

TABLE 11

Example 4 Specification

| | |
|---|---|
| f' | 2.42 |
| Bf' | 3.10 |
| FNo. | 2.30 |
| 2ω[°] | 112.0 |

TABLE 12

Example 4 Aspheric Coefficients

| Surface number | 3 | 4 | 8 |
|---|---|---|---|
| KA | −3.8241269E+00 | −5.1470598E−02 | 9.6944368E+00 |
| A3 | −1.0044432E−03 | −8.7797957E−04 | 4.0106047E−05 |
| A4 | −2.6668562E−04 | −5.2602647E−05 | −1.2853033E−04 |
| A5 | −2.4704942E−05 | −1.1377757E−05 | −1.1181143E−04 |
| A6 | 4.7137355E−06 | −8.4757849E−06 | 1.6709921E−04 |
| A7 | 1.2433618E−06 | −1.9228245E−06 | 6.9909242E−05 |
| A8 | 8.9977975E−09 | −8.1517736E−08 | −4.5633625E−05 |
| A9 | −2.4374234E−08 | −2.5064098E−08 | 3.6913088E−05 |
| A10 | 4.1544918E−10 | −4.0068956E−09 | 1.1850902E−04 |
| A11 | 0.0000000E+00 | 0.0000000E+00 | 0.0000000E+00 |
| A12 | 0.0000000E+00 | 0.0000000E+00 | 0.0000000E+00 |

| Surface number | 9 | 12 | 13 |
|---|---|---|---|
| KA | 3.0287452E−01 | 1.1693812E+00 | −8.0047087E−01 |
| A3 | −1.8703055E−05 | −2.4998187E−04 | −1.8312155E−04 |
| A4 | 2.1969524E−04 | −6.9176242E−05 | 4.9434286E−04 |
| A5 | 1.3676257E−04 | 3.5861943E−05 | 1.3444871E−04 |
| A6 | 7.2016180E−05 | 1.3856065E−05 | −1.5977610E−05 |
| A7 | 2.0364301E−05 | 2.9546402E−06 | −7.6691613E−06 |
| A8 | 3.3911345E−05 | 7.3207527E−07 | −1.2141923E−07 |
| A9 | 1.0236245E−05 | 1.5994114E−07 | 2.3658218E−07 |
| A10 | 6.9421706E−06 | −6.0645847E−09 | 3.8068046E−08 |
| A11 | 0.0000000E+00 | 0.0000000E+00 | 0.0000000E+00 |
| A12 | 0.0000000E+00 | 0.0000000E+00 | 0.0000000E+00 |

| Surface number | 14 | 15 |
|---|---|---|
| KA | 3.6065236E−01 | −1.0000002E+01 |
| A3 | 2.0239831E−03 | 1.8672425E−03 |
| A4 | 2.3426808E−04 | 6.7574155E−04 |
| A5 | 5.8407226E−05 | 9.0121767E−05 |
| A6 | 1.4163457E−05 | −6.6751039E−06 |
| A7 | 3.8963531E−06 | −7.9580218E−06 |
| A8 | −5.3199980E−07 | 4.5129527E−06 |
| A9 | −2.4530953E−07 | 1.0182370E−06 |
| A10 | −9.0460133E−08 | 7.4609098E−08 |
| A11 | 0.0000000E+00 | 0.0000000E+00 |
| A12 | 0.0000000E+00 | 0.0000000E+00 |

Figure 5:
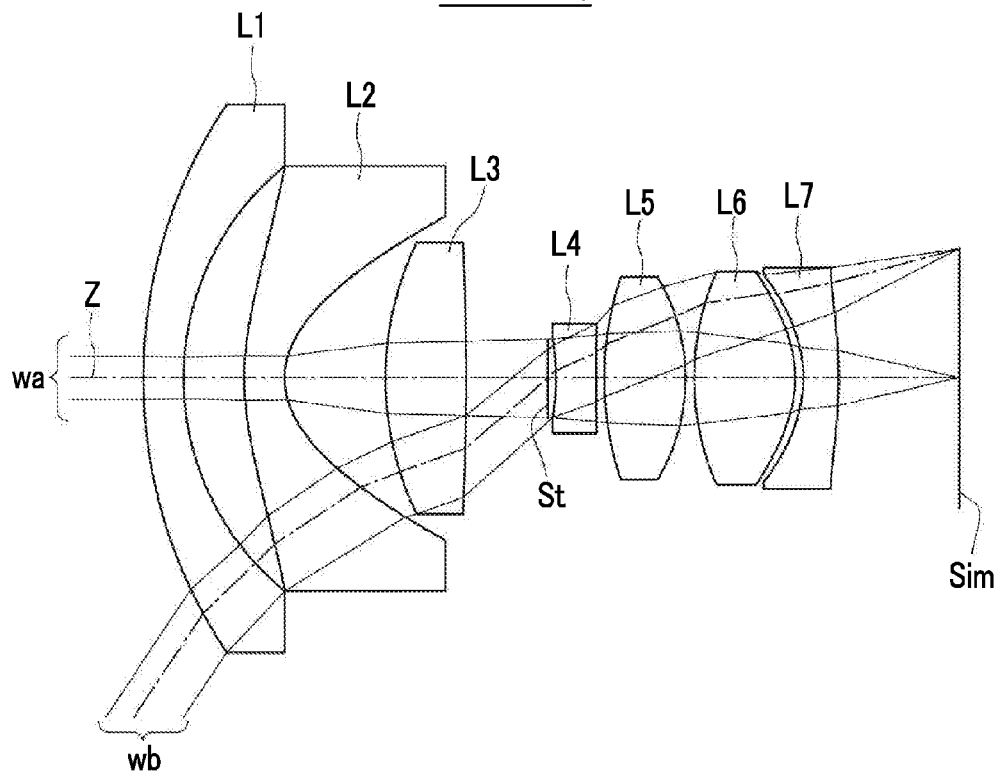
FIG. 5 is a cross-sectional view illustrating a lens configuration of an imaging lens of Example 5 of the present invention.
Figure 11:
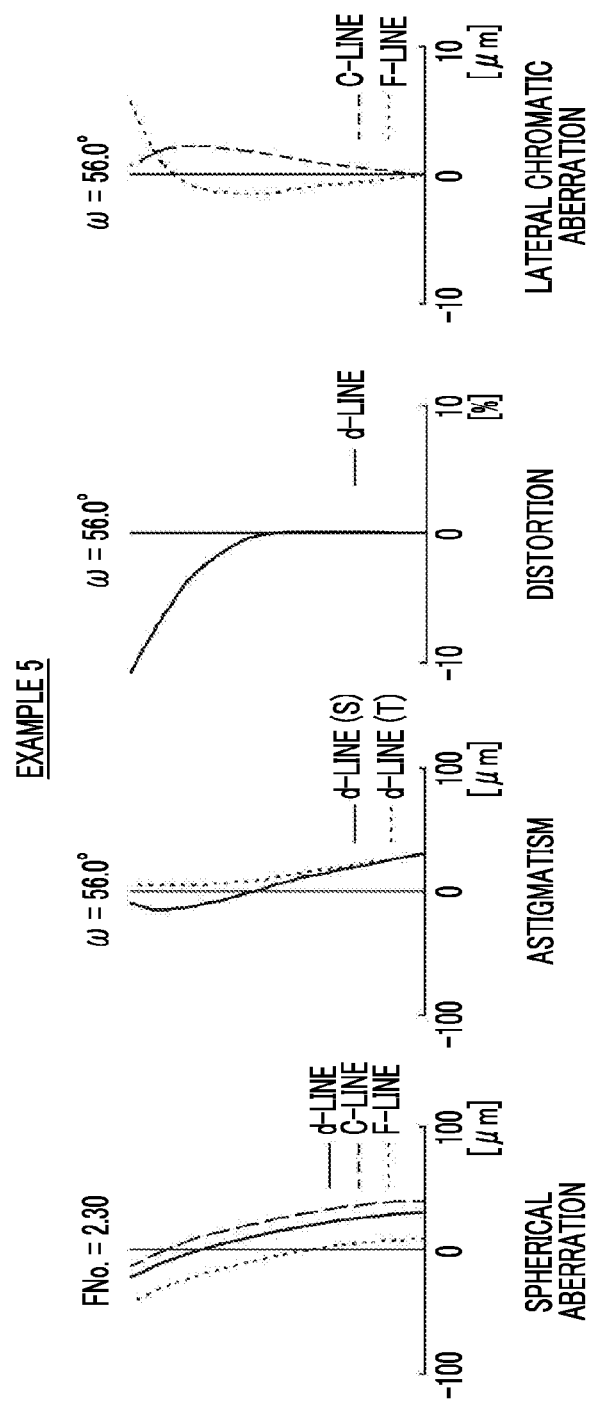
FIG. 11 is a diagram of aberrations of the imaging lens of Example 5 of the present invention.

Next, an imaging lens of Example 5 will be described. FIG. 5 is a cross-sectional view illustrating a lens configuration of the imaging lens of Example 5. Further, Table 13 shows basic lens data of the imaging lens of Example 5, Table 14 shows data about specification thereof, and Table 15 shows data about aspheric coefficients thereof. FIG. 11 shows aberration diagrams thereof.

TABLE 13

Example 5 Lens Data (n and ν are at d-line)

| Surface number | Radius of curvature | Surface distance | n | ν |
|---|---|---|---|---|
| 1 | 12.0622 | 1.0000 | 1.75500 | 52.32 |
| 2 | 6.7259 | 1.5017 | | |
| *3 | 6.6866 | 1.0000 | 1.53112 | 55.30 |
| *4 | 1.8301 | 2.5000 | | |
| 5 | 7.6342 | 2.0000 | 1.85478 | 24.80 |
| 6 | −67.5865 | 2.0000 | | |
| 7 (Diaphragm) | ∞ | 0.2000 | | |
| *8 | −6.4171 | 1.0000 | 1.63360 | 23.61 |
| *9 | 71.6294 | 0.2000 | | |
| 10 | 7.8040 | 2.0132 | 1.59522 | 67.73 |
| 11 | −4.8544 | 0.2137 | | |
| *12 | 6.4774 | 2.5000 | 1.53112 | 55.30 |
| *13 | −3.0735 | 0.2000 | | |
| *14 | −3.3285 | 0.9000 | 1.63360 | 23.61 |
| *15 | −10.6162 | 2.9836 | | |

TABLE 14

Example 5 Specification

| | |
|---|---|
| f | 2.42 |
| Bf | 3.01 |
| FNo. | 2.30 |
| 2ω[°] | 112.0 |

TABLE 15

Example 5 Aspheric Coefficients

| Surface number | 3 | 4 | 8 |
|---|---|---|---|
| KA | −6.1221226E+00 | −4.8389472E−02 | 8.9545563E+00 |
| A3 | −9.7811799E−04 | −8.3825254E−04 | 7.9140289E−05 |
| A4 | −2.6752819E−04 | −4.7098756E−05 | −1.2242874E−04 |
| A5 | −2.4386571E−05 | −9.4237684E−06 | −1.0937301E−04 |
| A6 | 4.3274089E−06 | −8.0335560E−06 | 1.6152833E−04 |
| A7 | 1.2408224E−06 | −1.9164762E−06 | 6.9897384E−05 |
| A8 | −5.2641702E−10 | −7.4247823E−08 | −4.5662175E−05 |
| A9 | −2.2722179E−08 | −2.3414520E−08 | 3.6916279E−05 |
| A10 | 3.6344497E−10 | −4.3160397E−09 | 9.7413226E−05 |
| A11 | 0.0000000E+00 | 0.0000000E+00 | 0.0000000E+00 |
| A12 | 0.0000000E+00 | 0.0000000E+00 | 0.0000000E+00 |

| Surface number | 9 | 12 | 13 |
|---|---|---|---|
| KA | −4.0423074E+00 | 8.3677380E−01 | −8.3333103E−01 |
| A3 | −5.3008458E−06 | −2.3172030E−04 | −2.0965683E−04 |
| A4 | 2.3425098E−04 | −8.4347407E−05 | 4.9740707E−04 |
| A5 | 1.3827079E−04 | 3.6180041E−05 | 1.3595643E−04 |
| A6 | 7.1873014E−05 | 1.4005289E−05 | −1.5893855E−05 |
| A7 | 2.0366805E−05 | 3.0198551E−06 | −7.6759626E−06 |
| A8 | 3.3914446E−05 | 7.3940101E−07 | −1.2357959E−07 |
| A9 | 1.0237680E−05 | 1.6383867E−07 | 2.3641332E−07 |
| A10 | 6.9420338E−06 | −5.8351537E−09 | 3.7915926E−08 |
| A11 | 0.0000000E+00 | 0.0000000E+00 | 0.0000000E+00 |
| A12 | 0.0000000E+00 | 0.0000000E+00 | 0.0000000E+00 |

| Surface number | 14 | 15 |
|---|---|---|
| KA | 3.0790182E−01 | −1.0000009E+01 |
| A3 | 2.0388258E−03 | 1.8307524E−03 |

TABLE 15-continued

Example 5 Aspheric Coefficients

| | | |
|---|---|---|
| A4 | 2.3139568E−04 | 6.8416248E−04 |
| A5 | 5.9940472E−05 | 9.0492490E−05 |
| A6 | 1.4283623E−05 | −6.6926840E−06 |
| A7 | 3.8912032E−06 | −7.9462036E−06 |
| A8 | −5.2717767E−07 | 4.5180420E−06 |
| A9 | −2.4490944E−07 | 9.8838275E−07 |
| A10 | −9.1118471E−08 | 8.1505374E−08 |
| A11 | 0.0000000E+00 | 0.0000000E+00 |
| A12 | 0.0000000E+00 | 0.0000000E+00 |

Figure 6:
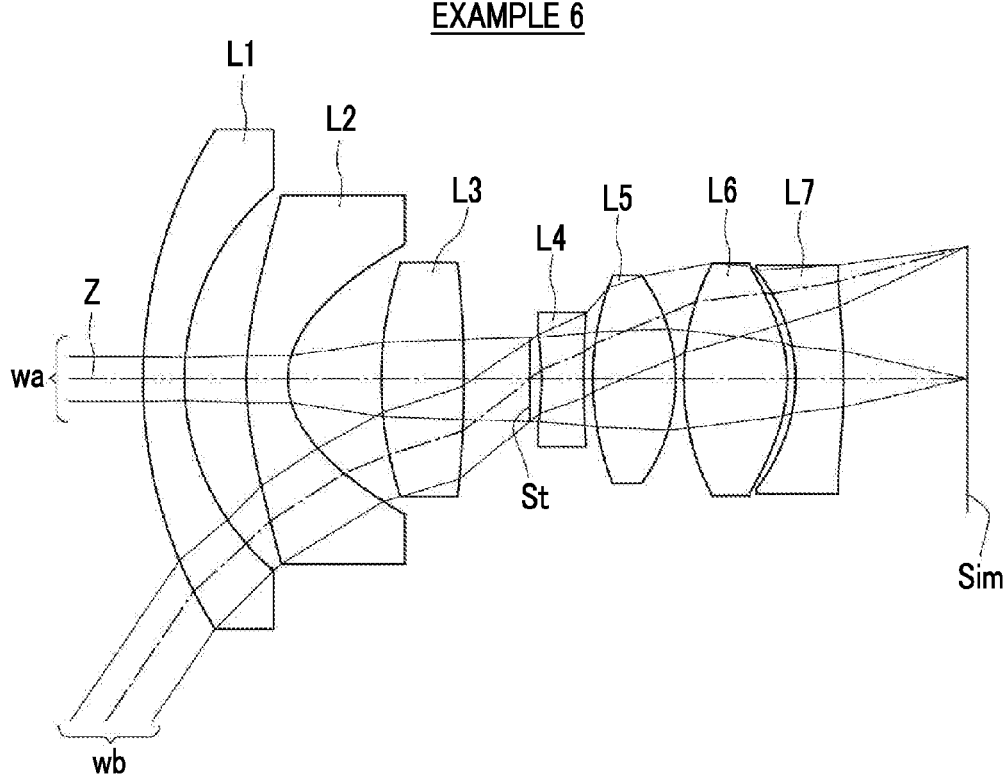
FIG. 6 is a cross-sectional view illustrating a lens configuration of an imaging lens of Example 6 of the present invention.
Figure 12:
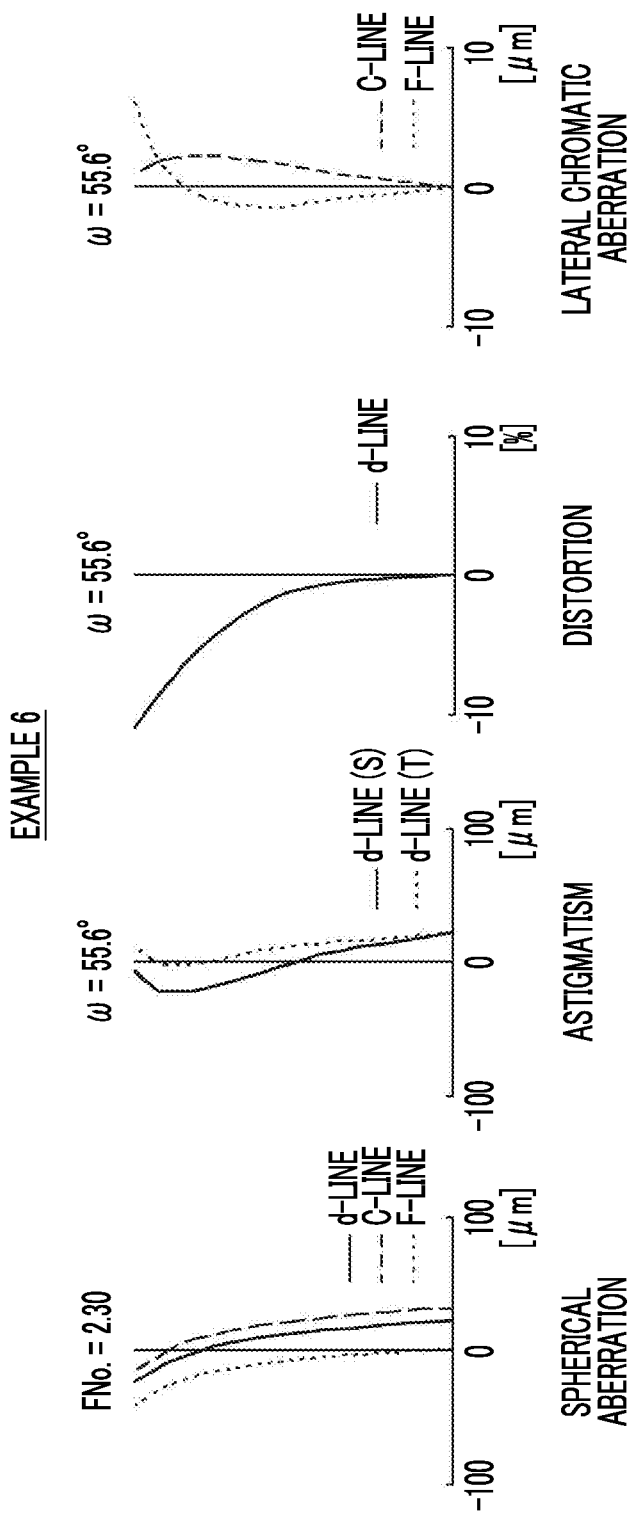
FIG. 12 is a diagram of aberrations of the imaging lens of Example 6 of the present invention.

Next, an imaging lens of Example 6 will be described. FIG. 6 is a cross-sectional view illustrating a lens configuration of the imaging lens of Example 6. Further, Table 16 shows basic lens data of the imaging lens of Example 6, Table 17 shows data about specification thereof, and Table 18 shows data about aspheric coefficients thereof. FIG. 12 shows aberration diagrams thereof.

TABLE 16

Example 6 Lens Data (n and ν are at d-line)

| Surface number | Radius of curvature | Surface distance | n | ν |
|---|---|---|---|---|
| 1 | 11.2005 | 1.0000 | 1.81600 | 46.62 |
| 2 | 5.9754 | 1.5000 | | |
| *3 | 7.3833 | 1.0000 | 1.53112 | 55.30 |
| *4 | 1.8756 | 2.2606 | | |
| 5 | 8.7350 | 2.0000 | 1.85896 | 22.73 |
| 6 | −25.2841 | 1.5787 | | |
| 7 (Diaphragm) | ∞ | 0.2740 | | |
| *8 | −7.8559 | 1.0234 | 1.63360 | 23.61 |
| *9 | 27.5694 | 0.2164 | | |
| 10 | 6.7556 | 2.0000 | 1.49700 | 81.54 |
| 11 | −4.2283 | 0.2000 | | |
| *12 | 6.0473 | 2.5000 | 1.53112 | 55.30 |
| *13 | −3.5191 | 0.2000 | | |
| *14 | −3.8187 | 1.1869 | 1.63360 | 23.61 |
| *15 | −12.6788 | 2.9906 | | |

TABLE 17

Example 6 Specification

| | |
|---|---|
| f | 2.46 |
| Bf | 3.01 |
| FNo. | 2.30 |
| 2ω[°] | 111.2 |

TABLE 18

Example 6 Aspheric Coefficients

| Surface number | 3 | 4 | 8 |
|---|---|---|---|
| KA | −5.5305621E+00 | 4.8300974E−02 | 1.0000009E+01 |
| A3 | −8.4646498E−04 | −8.2709511E−04 | 2.1595875E−05 |
| A4 | −2.5100297E−04 | 3.1730317E−05 | −1.0542749E−03 |
| A5 | −1.7652703E−05 | −7.4905079E−05 | −2.1792729E−04 |
| A6 | 5.3890583E−06 | −1.5322740E−05 | 1.3512313E−04 |
| A7 | 1.3767037E−06 | −5.3460712E−06 | 4.3930471E−05 |
| A8 | 1.3462629E−08 | −2.3587148E−07 | −5.7804423E−05 |
| A9 | −2.1684486E−08 | −4.0202990E−08 | 2.9202184E−05 |
| A10 | −1.7467690E−09 | −1.5556520E−08 | 1.4474383E−04 |
| A11 | 0.0000000E+00 | 0.0000000E+00 | 0.0000000E+00 |
| A12 | 0.0000000E+00 | 0.0000000E+00 | 0.0000000E+00 |

TABLE 18-continued

Example 6 Aspheric Coefficients

| Surface number | 9 | 12 | 13 |
|---|---|---|---|
| KA | −1.0000007E+01 | 6.4175085E−01 | −9.6475665E−01 |
| A3 | −3.2409291E−05 | −1.7408877E−04 | −1.0073427E−04 |
| A4 | 3.8794639E−04 | −1.3080292E−04 | 4.7469575E−04 |
| A5 | 1.5043462E−04 | 4.7484607E−05 | 1.2782115E−04 |
| A6 | 7.5618995E−05 | 2.7021768E−05 | −2.1140822E−05 |
| A7 | 2.0598268E−05 | 6.2329434E−06 | −7.6331465E−06 |
| A8 | 3.3399394E−05 | 1.2385005E−06 | 1.1756974E−07 |
| A9 | 1.1300927E−05 | 3.5138252E−07 | 3.5204681E−07 |
| A10 | 1.1233867E−05 | −7.6696520E−09 | 7.4443179E−08 |
| A11 | 0.0000000E+00 | 0.0000000E+00 | 0.0000000E+00 |
| A12 | 0.0000000E+00 | 0.0000000E+00 | 0.0000000E+00 |

| Surface number | 14 | 15 |
|---|---|---|
| KA | 7.5251029E−01 | −8.0493004E+00 |
| A3 | 2.0198839E−03 | 2.2892200E−03 |
| A4 | 2.8664523E−04 | 8.4932860E−04 |
| A5 | 6.1269918E−05 | 1.2650208E−04 |
| A6 | 1.6457645E−05 | 8.8191634E−06 |
| A7 | 4.3179942E−06 | −6.8755062E−06 |
| A8 | −5.3947515E−07 | 6.1588468E−06 |
| A9 | −4.5140750E−07 | 1.0926280E−06 |
| A10 | −2.7680701E−07 | 8.4048687E−08 |
| A11 | 0.0000000E+00 | 0.0000000E+00 |
| A12 | 0.0000000E+00 | 0.0000000E+00 |

Table 19 shows values corresponding to the conditional expressions (1) and (2) of the imaging lenses of Examples 1 to 6. It should be noted that, in the above-mentioned examples, the d-line is set as the reference wavelength, and the values shown in the following Table 19 are values at the reference wavelength.

TABLE 19

| Expression number | Conditional expression | Example 1 | Example 2 | Example 3 | Example 4 | Example 5 | Example 6 |
|---|---|---|---|---|---|---|---|
| (1) | f/f12 | −1.613 | −1.579 | −1.570 | −1.653 | −1.611 | −1.471 |
| (2) | f/f1 | −0.102 | −0.087 | −0.105 | −0.108 | −0.110 | −0.143 |

As can be seen from the above-mentioned data, all the imaging lenses of Example 1 to 6 satisfy the conditional expressions (1) and (2), and are imaging lenses each of which is a wide-angle imaging lens and is capable of satisfactorily correcting various aberrations.

Figure 13:
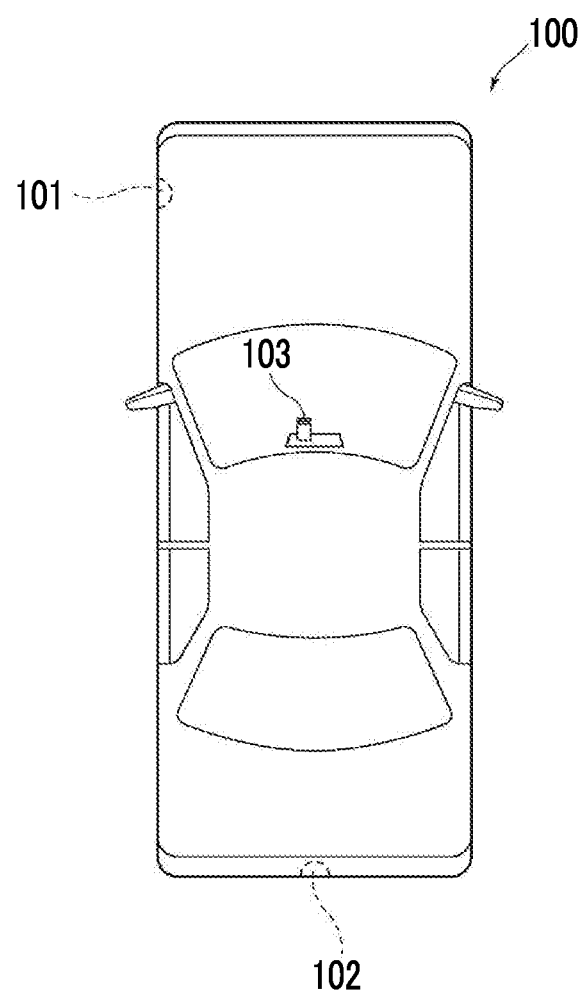
FIG. 13 is a schematic configuration diagram of an imaging apparatus according to an embodiment of the present invention.

Next, an imaging apparatus according to an embodiment of the present invention will be described. Here, as an embodiment of the imaging apparatus of the present invention, an example in a case of applying the invention to an on-board camera will be described. FIG. 13 shows a situation where the on-board camera is mounted on a vehicle.

In FIG. 13, a vehicle 100 comprises: an outside-vehicle camera 101 that is for capturing an image of a blind area on a lateral side of a passenger seat; an outside-vehicle camera 102 that is for capturing an image of a blind area on a rear side of the vehicle 100; and an in-vehicle camera 103 which is mounted on the rear of the rearview mirror in order to capture an image in a range of field of view which is the same as that of a driver. The outside-vehicle camera 101, the outside-vehicle camera 102, and the in-vehicle camera 103 are imaging apparatuses, and each apparatus comprises the imaging lens according to the embodiment of the present invention; and an imaging element that converts an optical image, which is formed through an imaging lens, into an electrical signal. The on-board cameras (the outside-vehicle cameras 101 and 102 and the in-vehicle camera 103) of the present embodiment each comprise the imaging lens of the present invention. Thus, it is possible to capture a high quality image with a wide angle of view.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the numerical examples, and different values may be used therefor.

The imaging apparatuses according to the embodiment of the present invention are also not limited to the on-board cameras, but may include various embodiments such as a mobile terminal camera, a surveillance camera, and a digital camera.

EXPLANATION OF REFERENCES

100: vehicle
101, 102: outside-vehicle camera
103: in-vehicle camera
L1 to L7: lens
Sim: image plane
St: aperture diaphragm
wa: on-axis rays
wb: rays with maximum angle of view
Z: optical axis

What is claimed is:

1. An imaging lens consisting of, in order from an object side:
   a first lens that has a negative refractive power;
   a second lens that has a negative refractive power;
   a third lens that has a positive refractive power;
   a fourth lens that has a negative refractive power;
   a fifth lens that has a positive refractive power;
   a sixth lens that has a positive refractive power; and
   a seventh lens that has a negative refractive power,
   wherein the following conditional expressions (1) and (2) are satisfied, $$-2 < f/f12 < -1.47 \quad (1),$$

$$-0.2 < f/f1 < 0 \quad (2),$$

where f is a focal length of a whole system,
      f1 is a focal length of the first lens, and
      f12 is a composite focal length of the first lens and the second lens.

2. The imaging lens according to claim 1,
   wherein the following conditional expression (1-1) is satisfied, $$-1.75 < f/f12 < -1.55 \quad (1\text{-}1).$$

3. The imaging lens according to claim 1,
wherein an object side surface of the first lens is a convex surface.

4. The imaging lens according to claim 2,
wherein an object side surface of the first lens is a convex surface.

5. The imaging lens according to claim 1,
wherein the following conditional expression (2-1) is satisfied, $$-0.15 < f/f1 < -0.08 \tag{2-1}$$

6. The imaging lens according to claim 2,
wherein the following conditional expression (2-1) is satisfied, $$-0.15 < f/f1 < -0.08 \tag{2-1}$$

7. The imaging lens according to claim 3,
wherein the following conditional expression (2-1) is satisfied, $$-0.15 < f/f1 < -0.08 \tag{2-1}$$

8. The imaging lens according to claim 4,
wherein the following conditional expression (2-1) is satisfied, $$-0.15 < f/f1 < -0.08 \tag{2-1}$$

9. An imaging apparatus comprising the imaging lens according to claim 1.

10. An imaging apparatus comprising the imaging lens according to claim 2.

11. An imaging apparatus comprising the imaging lens according to claim 3.

12. An imaging apparatus comprising the imaging lens according to claim 4.

\* \* \* \* \*